(12) United States Patent
Panchanathan et al.

(10) Patent No.: US 10,680,954 B2
(45) Date of Patent: *Jun. 9, 2020

(54) EMBEDDED DIAGNOSTIC TOOL FOR PREDICTION OF PROBLEMS RELATING TO NETWORK BANDWIDTH

(71) Applicant: EMC IP Holding Company LLC, Hopkinton, MA (US)

(72) Inventors: Balaji Panchanathan, Chennai (IN); Prafful Agarwal, Uttar Pradesh (IN); Pravin Ashokkumar, Karnataka (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/032,930

(22) Filed: Jul. 11, 2018

(65) Prior Publication Data

US 2018/0324098 A1 Nov. 8, 2018

Related U.S. Application Data

(62) Division of application No. 15/242,130, filed on Aug. 19, 2016, now Pat. No. 10,116,569.

(51) Int. Cl.
*H04L 12/803* (2013.01)
*H04L 12/26* (2006.01)
*H04L 12/721* (2013.01)
*G06F 16/2455* (2019.01)
*H04L 29/08* (2006.01)
*H04L 12/24* (2006.01)

(52) U.S. Cl.
CPC ...... *H04L 47/125* (2013.01); *G06F 16/24556* (2019.01); *H04L 41/145* (2013.01); *H04L 41/147* (2013.01); *H04L 43/0882* (2013.01); *H04L 45/70* (2013.01); *H04L 67/1095* (2013.01); *H04L 67/1097* (2013.01); *H04L 43/0811* (2013.01); *H04L 67/06* (2013.01)

(58) Field of Classification Search
CPC .................................................... H04L 47/125
See application file for complete search history.

(56) References Cited

U.S. PATENT DOCUMENTS

| | | | |
|---|---|---|---|
| 9,454,321 B1 | 9/2016 | Smaldone et al. | |
| 2004/0122832 A1* | 6/2004 | Heil | G06F 11/1464 |
| 2013/0204848 A1 | 8/2013 | Akirav | |
| 2014/0101398 A1* | 4/2014 | Mu | G06F 11/1453 |
| | | | 711/162 |

(Continued)

OTHER PUBLICATIONS

U.S. Appl. No. 15/242,130, filed Aug. 19, 2016, Panchanathan et al.

(Continued)

*Primary Examiner* — Nicholas P Celani
(74) *Attorney, Agent, or Firm* — Workman Nydegger (57) ABSTRACT

In one example, a method includes measuring an available bandwidth of a communication path between a server and another entity, listening on a communication port that is connected to the other entity, receiving, from the other entity, a request for a data deduplication rate (DDR) information associated with a particular plugin type, querying a database for the DDR information, and returning the requested DDR information to the other entity.

12 Claims, 6 Drawing Sheets

(56) References Cited

U.S. PATENT DOCUMENTS

| | | | |
|---|---|---|---|
| 2014/0181039 A1* | 6/2014 | Harrison | G06F 3/0608 707/652 |
| 2015/0134723 A1* | 5/2015 | Kansal | H04L 67/1031 709/203 |
| 2015/0281087 A1 | 10/2015 | Jalan | |
| 2017/0214773 A1 | 7/2017 | Fan et al. | |

OTHER PUBLICATIONS

U.S. Appl. No. 15/242,130, Jul. 2, 2018, Notice of Allowance.
U.S. Appl. No. 16/144,804, filed Sep. 27, 2018, Panchanathan et al.
U.S. Appl. No. 16/144,804, dated Sep. 18, 2019, Office Action.
U.S. Appl. No. 16/144,804, dated Nov. 4, 2019, Final Office Action.
U.S. Appl. No. 16/144,804, dated Jan. 17, 2020, Advisory Action.

* cited by examiner

EMBEDDED DIAGNOSTIC TOOL FOR PREDICTION OF PROBLEMS RELATING TO NETWORK BANDWIDTH

RELATED APPLICATIONS

This application is a divisional of, and hereby claims priority to, U.S. patent application Ser. No. 15/242,130, entitled EMBEDDED DIAGNOSTIC TOOL FOR PREDICTION OF PROBLEMS RELATING TO NETWORK BANDWIDTH, and filed Aug. 19, 2016. All of the aforementioned applications are incorporated herein in their respective entireties by this reference.

FIELD OF THE INVENTION

Embodiments of the present invention generally concern backup and restoration of data, and the management of backed up data. More particularly, at least some embodiments of the invention relate to systems, hardware, computer-readable media, and methods directed to implementation of diagnostic functionality in a data backup and storage environment.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was lost or compromised, and then restore that data to one or more locations, machines and/or environments.

However, the configuration of some backup and storage environments can give rise to various problems. Consider the hypothetical example of an environment that may include one or more clients that cooperate with a backup server to create backups of client data for storage and later restoration. In this example, a storage server can also be provided that communicates with the backup server, and one or more of the clients in some instances. The storage server can be in a different network than the clients and backup server.

As a result of the use of multiple networks, each of which includes various respective entities that must interface with entities within, and outside, their network, problems such as backup failures and slow checkpoint processes can arise. A related problem is that it can be difficult to determine how the backup and storage environment is performing as a whole. For example, an administrator may not have access to network connectivity and throughput information among the various entities in the environment that would alert the administrator to conditions such as backup failures and slow checkpoint processes.

In light of problems such as those noted above, and/or others, it would be useful to include a network diagnostic tool that can provide an administrator with information concerning network performance. As well, it would be useful to be able to embed the network diagnostic tool in a backup client and associated backup server. It would also be useful for the network diagnostic tool to gather and provide information concerning parameters such as communication bandwidth between the backup client and entities it communicates with, such as a backup server and a storage server. Finally, it would be useful to for the network diagnostic to gather and provide information concerning communication bandwidth between a backup server and a storage server.

DESCRIPTION OF THE FIGURES

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally concern backup and restoration of data, and the management of backed up data. More particularly, at least some embodiments of the invention relate to systems, hardware, computer-readable media, and methods directed to implementation of diagnostic functionality in a data backup and storage environment.

Embodiments of the invention can be employed, for example, in connection with backup data targeted for storage, and in connection with backup data that has already been stored. In some cases, embodiments of the invention are implemented in connection with a cloud storage environment, although that is not required and other embodiments can be employed in association with any other storage environment.

Embodiments of the invention can be employed in connection with any type or form of data. As used herein, the terms 'data' and 'data element' are intended to be construed broadly and embrace, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data. Likewise, the term 'metadata' as used herein is intended to be broad in scope and embraces, at least, any information about any of the types of data disclosed herein. Examples of metadata include, but are not limited to, information about a data element such as the version, creation date, and expiration date.

As well, it should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection and later restoration.

In connection with the examples disclosed elsewhere herein, it should be noted that the use of the term 'object' is employed simply as a convenient way to illustrate aspects of embodiments of the invention. However, the scope of the invention is not limited to the use of objects nor to any other particular form, group, set, combination or string, of data or data element.

At least some embodiments of the invention can be employed in an environment that includes one or more clients that cooperate with a backup server to create backups of client data for storage and later restoration. The clients and backup server can be in the same network. The environment can also include one or more storage servers that communicate with the backup server, and one or more of the clients in some instances. The storage server can be in a different network than the clients and backup server, and the storage server can store the backups cooperatively created by the clients and backup server.

An embedded network diagnostic tool is provided in the clients and in the backup server. The functions performed by the network diagnostic tool may vary depending upon where the network diagnostic tool is deployed. For example, a client version of the network diagnostic tool can perform such functions as, but not limited to, checking and reporting on network connectivity between the client and the backup server, checking and reporting on Path Maximum Transmission Unit (PMTU)—related parameters, calculating bandwidth needed for a backup operation, measuring bandwidth between a client and the backup server, and sending alerts concerning actual or contemplated operations involving the client and the backup server.

As noted above, the functions performed by the network diagnostic tool may vary depending upon where the network diagnostic tool is deployed. Thus, a backup server version of the network diagnostic tool can perform functions such as, but not limited to, checking and reporting on PMTU—related parameters, checking network connectivity between the backup server and a storage server, and measuring available bandwidth between the backup server and a storage server.

Advantageously then, embodiments of the invention may enable timely identification and analysis of backup problems that may be traceable to network conditions. This may in turn lead to resolution of the network conditions and restoration of optimum, or at least improved, backup and storage operations.

A. Example Operating Environment

In general, embodiments of the invention may include and/or be implemented in an operating environment that includes various clients and/or other devices that generate and/or cause the generation of data that is backed up by a cloud storage provider at a cloud storage site. In at least some embodiments of the invention, any of the methods disclosed herein can be performed in whole or in part at a cloud storage site and/or an enterprise premises, although that is not necessarily required. In some instances, certain portions of a method are performed at a cloud storage site, while other portions of that method are performed at an enterprise premises. The allocations of functionalities between an enterprise premises and cloud storage site dis-closed herein are presented by way of example only and, more generally, such functionalities can be distributed in any other suitable manner.

As used herein, the term 'client' is intended to have broad scope and embraces, among other things, any system, device, or combination of those, by way of which access, whether direct or indirect, to cloud based storage can be achieved. As such, one or more clients may be in a cloud system, and/or one or more clients may be located at a customer site.

Figure 1:
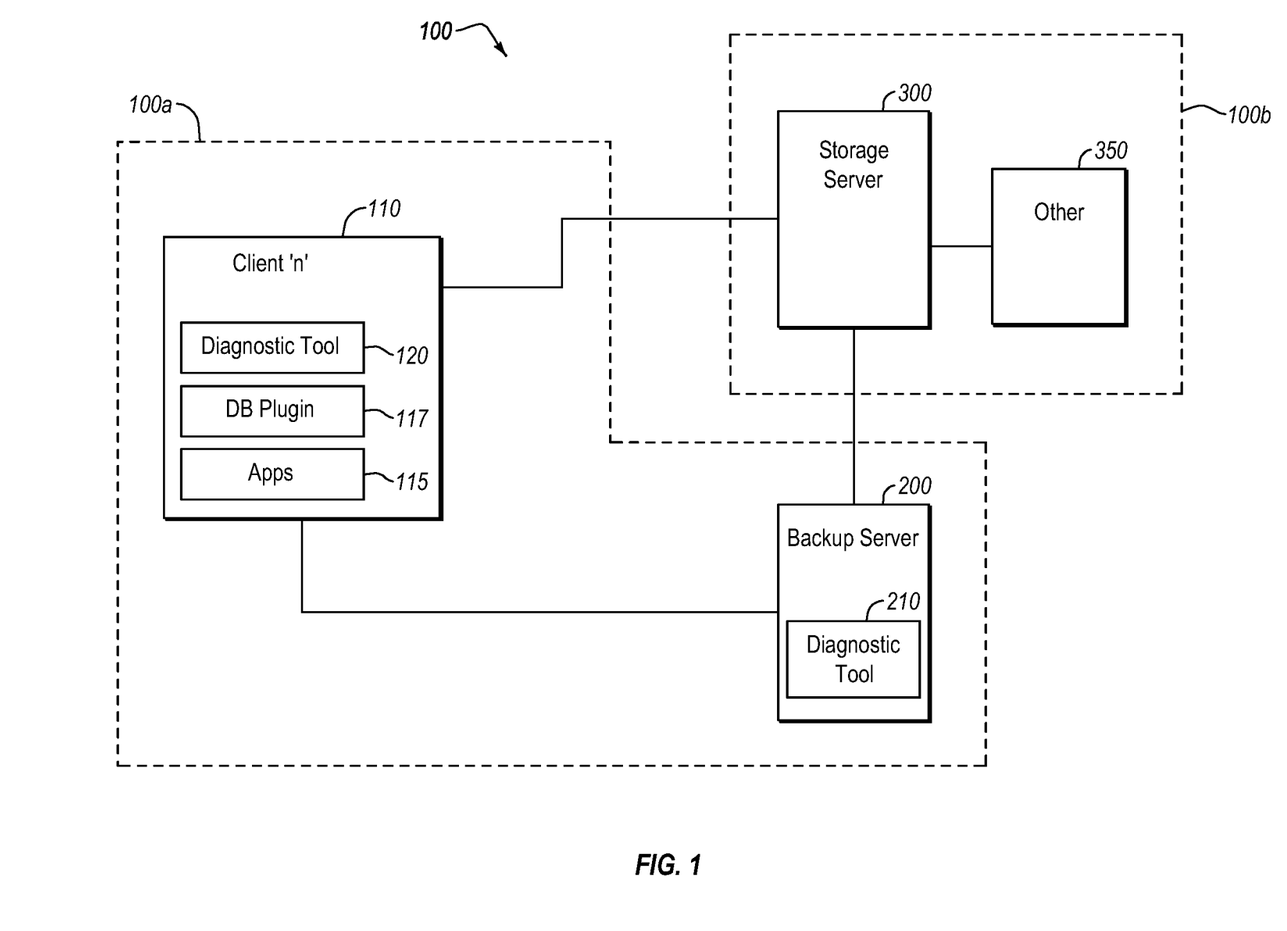
FIG. 1 is directed to aspects of an example operating environment for at least some embodiments.

With attention now to FIG. 1, details are provided concerning some operating environments, one example of which is denoted at 100, in connection with which various embodiments of the invention may be employed. In FIG. 1, the example operating environment 100 may be a network such as a local area network, a wide area network, the internet, or any other networked configuration. The operating environment 100 can take the form of a single network, or multiple networks such as network 100a and network 100b, whose respective entities may be able to communicate with each other.

Moreover, the operating environment 100, or any group of one or more of its elements, may comprise, form an element of, or constitute, a cloud computing environment. In other embodiments, some, or all, of the elements of the operating environment 100 can reside on-premises at an enterprise. The operating environment 100 may include various devices including servers and other computers that are interconnected. The operating environment 100 may employ a variety of communication media, such as hardwire, optical, wireless, or some combination thereof. Unless otherwise indicated, communication between entities shown as connected can be unidirectional, or bidirectional.

The example operating environment 100 may include any number 'n' of clients 110. One or more of the clients 110 can host, or otherwise employ, one or more applications 115, and a plugin 117, which can take the form of a database plugin that enables the client 110 to communicate with a database or other data structure where client data is stored. In some embodiments, the database can be resident at the client 110, or can be located remote from the client 110. In general, the plugin 117 refers to a set of clients supported by the backup server 200, which can be an Avamar server for example. Some example plugins 117 include, but are not limited to, the Linux filesystem, Windows filesystem, Oracle® database, mssql (Microsoft SQL), and an in-memory, column-oriented, relational database management system sometimes referred to as "SAP HANA," wherein "HANA" refers to "High-Performance Analytic Appliance." The scope of the invention is not limited to any particular plugin 117 or combination of plugins 117.

The applications 115, which can be any type of application, may generate, and/or cause the generation of, data and associated metadata that is desired to be stored, such as in the form of a backup for example, and that can be used to restore data to the client 110. One of the applications 115 on the client 110 may be a backup client that can cooperate with a backup application on a backup server 200 to generate one or more backups of data and metadata of the client 110 for storage, such as at a storage server 300 for example, and subsequent restoration. Examples of such a backup server 200 include, but are not limited to, the EMC Avamar server, and the EMC NetWorker server, although the scope of the invention is not limited to those example implementations. The storage server 300 can take the form of an EMC Data Domain server, although that is not required. Finally, the client 110 can be an Avamar client in some embodiments.

The backup server 200 and the client 110 may be part of the same network 100a. In some embodiments, the backup server 200 may reside on-premises with the client 110, although that is not required. The storage server 300 and various other components 350 can be part of the network 100b. In general, the storage server 300 enables storage of backups of the clients 110. That is, backups of client 110 data created by cooperation between the client 110 and backup server 200 can be stored by the backup server 200 at the storage server 300 for later restoration to the client 110.

The client 110 may include, in addition to one or more applications 115, a diagnostic tool 120. In general, and as discussed in more detail elsewhere herein, the diagnostic tool 120, whether operating alone or in conjunction with a diagnostic tool 210 of the backup server 200, may enable timely identification and analysis of backup problems that may be traceable to network conditions. This may in turn lead to resolution of the network conditions and restoration of optimum, or at least improved, backup and storage operations. Aspects of the respective functionalities of the diagnostic tool 120 and the diagnostic tool 210 may be similar, or identical, in some embodiments.

B. Example Host Configuration

Figure 2:
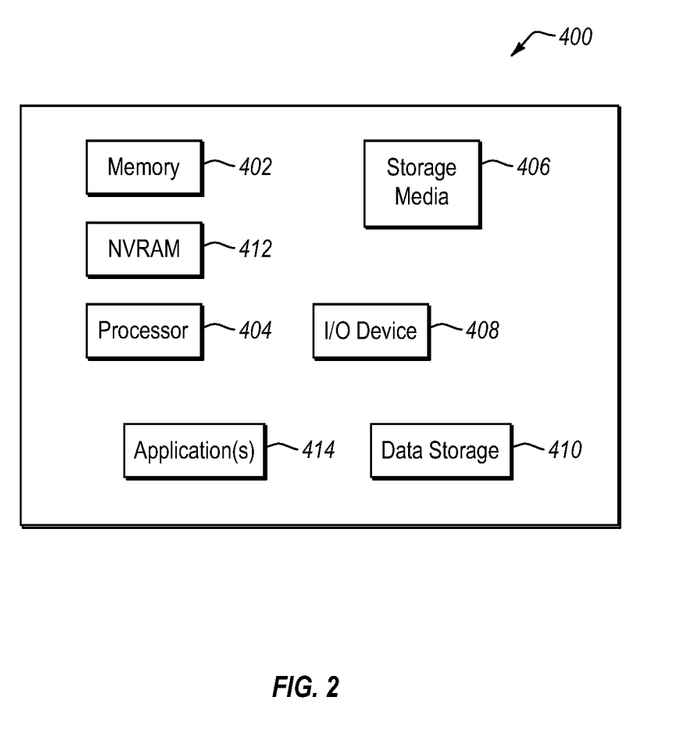
FIG. 2 is directed to an example computing device that may be employed in connection with some embodiments of the invention.

With reference briefly to FIG. 2, the diagnostic functionality, backup functionality, and storage functionality, disclosed herein, can be hosted on respective servers. Such servers can consist of, comprise, or take the form of, one or more physical computing devices, one example of which is denoted at 400 in FIG. 2. In the example of FIG. 2, the computing device 400 includes a memory 402, one or more hardware processors 404, non-transitory storage media 406, I/O device 408, data storage 410, and NVRAM 412. As well, one or more applications 414 are provided that comprise executable instructions. Such executable instructions can take the form, for example, of any one or more of client applications, a diagnostic tool such as for a client or a backup server, a backup application, a backup application client, a storage application, or a restoration application. Additional, or alternative, applications can likewise be included in the applications 414.

C. Aspects of Some Example Diagnostic Processes

Figure 3:
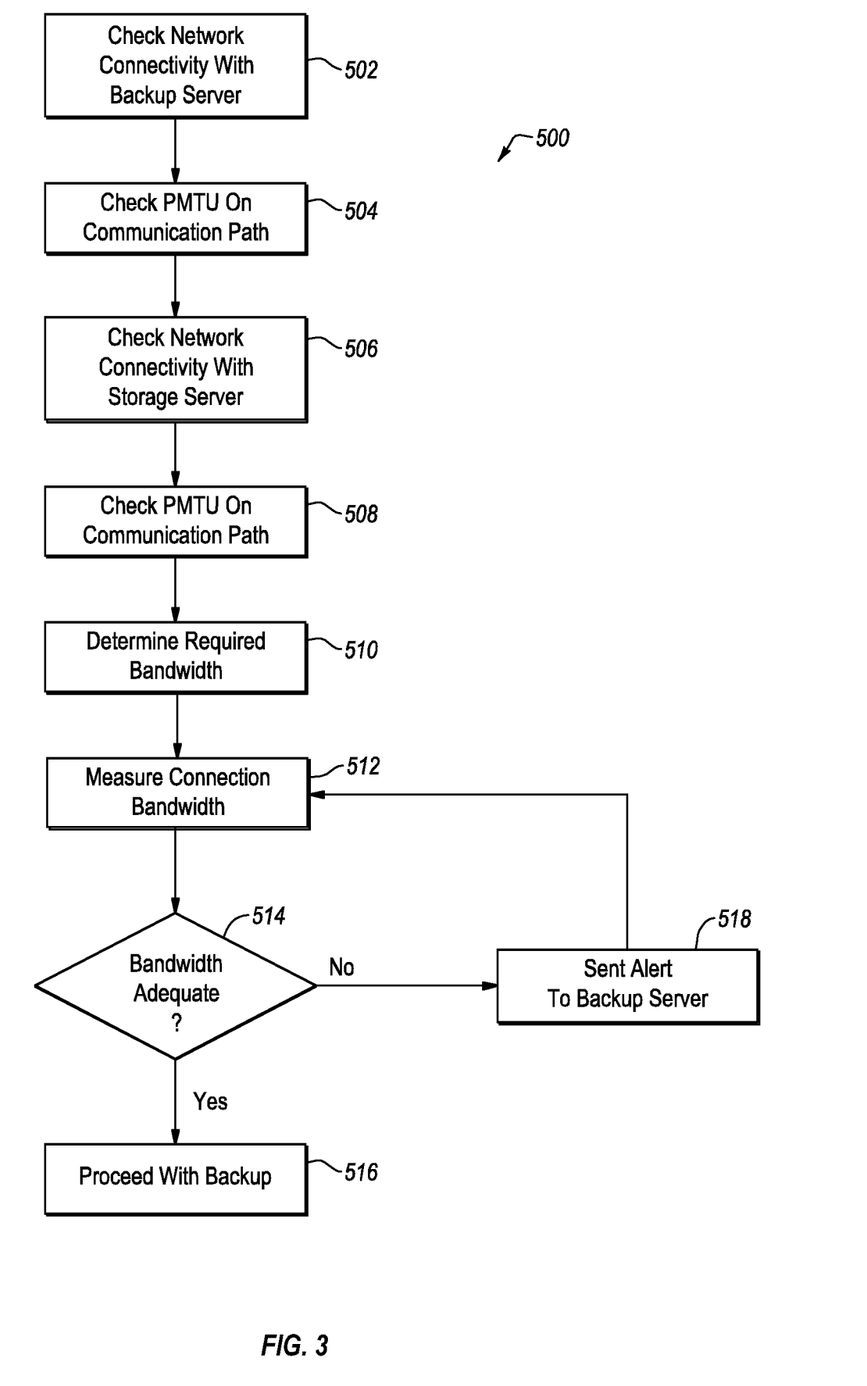
FIG. 3 is a flow diagram directed to aspects of an example method for performing network diagnostics.

With attention now to FIG. 3, details are provided concerning aspects of some example methods, one particular example of which is denoted generally at 500. Part, or all, of the method 500 can be performed, for example, by a diagnostic tool that resides on a client. Embodiments of the method 500 can be performed in any suitable environment. At least some example embodiments of the method 500 can be performed in an EMC Avamar backup server environment, where a Data Domain server is used as the storage target and the Data Domain server is in a different network from the Avamar server and Avamar client network. Among other things, the method 500 can provide a way to check the network connectivity/throughput measurement between the client(s) and the backup server. It should be noted that while the method 500 indicates various processes being performed in order, the processes of the method 500 can be performed in any other order. Moreover, at least some embodiments of the method 500 include fewer than all the processes indicated in FIG. 3.

The method 500 can begin at 502 where the diagnostic tool of the client checks the network connectivity between the client and a backup server to ensure that communication is occurring, or is at least possible, between those two entities. This process 502 can be performed at regular time or event intervals and/or on any other basis. The process 502 may also comprise reporting the findings concerning network connectivity to an administrator and/or other entity. Such findings can be reported each time a network connectivity check 502 is performed, or the findings from multiple network connectivity checks 502 can be aggregated and sent as a group after a plurality of network connectivity checks 502 have been performed.

The method 500 can further involve checking the PMTU 504 along the communication path between the client and the backup server. In more detail, Path MTU Discovery (PMTUD) is an example of a technique for determining the maximum transmission unit (MTU) size on the network path between two Internet Protocol (IP) hosts, such as between a client and a backup server for example. For PMTU discovery, Internet Control Message Protocol (ICMP) messages can be used to find the path MTU. In this way, performance of the network is not degraded due to fragmentation.

In addition to the aforementioned checks, the method 500 may include the performance of one or more network connectivity checks 506 between the client and a storage server. This process 506 can be performed at regular time or event intervals and/or on any other basis. The process 506 may also comprise reporting the findings concerning network connectivity to an administrator and/or other entity. Such findings can be reported each time a network connectivity check 506 is performed, or the findings from multiple network connectivity checks 506 can be aggregated and sent as a group after a plurality of network connectivity checks 506 have been performed. In connection with the process 506, the method 500 may further involve checking the PMTU 508 along the communication path between the client and the storage server.

At such time as connectivity between the client and backup server, for example, has been ascertained to exist, the network bandwidth needed for a particular backup can be determined 510. In particular, the process 510 can include calculation of the network bandwidth required along the communication path between the client and the backup server. As discussed in more detail below, this calculation can be based on the side of the dataset that will be backed up, and the deduplication rate for the dataset.

With the required network bandwidth known, the actual connection bandwidth available between the client and the backup server can be measured 512. The measured bandwidth can be used to determine whether and/or when or not a particular backup will be performed. For example, a comparison 514 of available and required bandwidth for the backup can be performed. If the available bandwidth between the client and the backup server is adequate to perform the backup, then the backup can proceed 516. On the other hand, if the available bandwidth between the client and the backup server is not adequate to perform the backup, then an alert can be sent 518 from the diagnostic tool at the client to the backup server, where the alert can be accessed by an administrator for example.

In some embodiments, the method 500 can return to 512 after the alert is sent 518. Specifically, another measurement of the available connection bandwidth can be performed 512, and the subsequent processes of the method 500 repeated. This process of returning to 512 after 518 can be performed recursively a set number of times, or for a set period of time. The process 500 can time out, or otherwise stop, if the connection bandwidth is not eventually determined to be adequate to support the requested backup process.

As will be apparent from the foregoing discussion, the method 500 can serve to proactively alert an administrator of network related issues, and the administrator can take corrective action prior to attempting a backup or other process. Thus, embodiments of the method 500 may help to avoid problems such as backup failure, and slow 'hfscheck' performance, that is, a hash filesystem check used to validate the integrity of a particular checkpoint, that can result from network communication problems between, for example, a client and backup server, and/or between a backup server and storage server.

Figure 4:
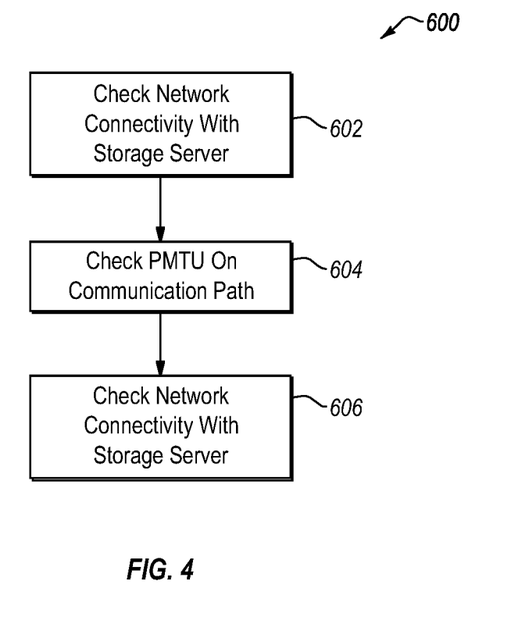
FIG. 4 is a flow diagram directed to aspects of another example method for performing network diagnostics.

Directing attention now to FIG. 4, details are provided concerning an example method 600. In general, part, or all, of the method 600 can be performed, for example, by a diagnostic tool that resides on a backup server. Embodiments of the method 600 can be performed in any suitable environment. At least some example embodiments of the method 600 can be performed in an EMC Avamar backup server environment, where a Data Domain server is used as the storage target and the Data Domain server is in a different network from the Avamar server and Avamar client network. Among other things, the method 600 can provide a way to check the network connectivity/throughput measurement between a backup server and a storage server. It should be noted that while the method 600 indicates various processes being performed in order, the processes of the method 600 can be performed in any other order. Moreover, at least some embodiments of the method 600 include fewer than all the processes indicated in FIG. 4. Finally, the method 600 can be performed at about the same time as the method 500, before the method 500, or after the method 500.

The method 600 can begin at 602 where the diagnostic tool of the backup server checks the network connectivity between the backup server and a storage server to ensure that communication is occurring, or is at least possible, between those two entities. This process 602 can be performed at regular time or event intervals and/or on any other basis. The process 602 may also comprise reporting the findings concerning network connectivity to an administrator and/or other entity. Such findings can be reported each time a network connectivity check 602 is performed, or the findings from multiple network connectivity checks 602 can be aggregated and sent as a group after a plurality of network connectivity checks 602 have been performed.

The method 600 can further involve checking the PMTU 604 along the communication path between the backup server and the storage server. As noted earlier, PMTUD is an example of a technique for determining the MTU size on the network path between two IP hosts, such as between a backup server and a storage server for example.

Finally, the method 600 may include the performance of one or more network connectivity checks 606 between the backup server and the storage server. This process 606 can be performed at regular time or event intervals and/or on any other basis. The process 606 may also comprise reporting the findings concerning network connectivity to an administrator and/or other entity. Such findings can be reported each time a network connectivity check 606 is performed, or the findings from multiple network connectivity checks 606 can be aggregated and sent as a group after a plurality of network connectivity checks 606 have been performed.

D. Aspects of Some Example Bandwidth Processes

As noted in the discussion of FIGS. 3 and 4, at least some example diagnostic processes within the scope of the invention may include processes for determining a required network bandwidth to support backup operations, storage operations, and restore operations. The determination of the required network bandwidth can be based on a variety of variables, depending upon the particular operation(s) to be performed.

In some example embodiments of the invention, the determination of required network bandwidth is based upon (i) the size of the client dataset that is targeted for backup, and (ii) a data deduplication rate (DDR) for that particular client. The data deduplication rate may, in turn, depend on (i) the type of database plugin used by that client, as well as on (ii) past backups of that client, and (iii) the past backups of clients in the same backup server network that use the same database plugin. In some embodiments, an Oracle® database plugin can be used, although that particular plugin is not required in other embodiments.

The client data deduplication rate can be set to a default value in some embodiments. The default value may differ from client to client, depending upon the client database plugin that is employed, and the default value may be useful where the client has not previously, or recently, employed that database plugin. The actual data deduplication rate information for one or more backup operations can be recorded, by the backup server for example. This information concerning actual data deduplication rates can be pushed from the backup server back to the client(s) using the plugin to which the data pertains, and the client(s) can use that actual data in place of a default value. An example may help to better illustrate this concept.

In particular, it might be assumed that in the case of the Oracle® database plugin, the value of the initial default data deduplication rate is 10 percent. After the backup is performed, one or more estimation models can be used to generate deduplication rates and the estimation model that produces the most accurate deduplication rate, that is, the deduplication rate that is closest to, and/or within an acceptable margin of, the actual deduplication rate for the backup can then be used to predict deduplication rates for future backups. This estimation process can be performed for one or more actual backups, or as many actual backups are necessary for statistical significance. In this way, an estimated deduplication rate for a particular dataset that is targeted for backup can be determined based on actual deduplication rates from one or more other backups. The estimated and actual deduplication rates can be stored at the backup server and/or the client(s) whose data is targeted for backup.

In some cases, as many as 3 or 4 different estimation models are used to determine a best fit with one or more actual deduplication rates, although more, or fewer, estimation models can be used in other embodiments of the invention. Various estimation models can be employed. One example of an estimation model is a moving average model which averages deduplication rates from the preceding 'n' number of backups, such as 4 backups for example, performed in connection with a particular plugin. This estimation model can perform estimates across multiple clients, as it considers the last 'n' backups in time, without reference to any particular client. Another example of an estimation model is a client-specific moving average model. This example model averages deduplication rates from the preceding 'n' number of backups, such as 4 backups for example, performed with respect to a particular client. A final example of an estimation model averages deduplication rates based on a particular timeframe. In particular, this model may average deduplication rates on a specific day, or other particular time period, for all clients that use a particular database plugin. It will be appreciated that aspects of these example estimation models can be combined in various ways to define still other estimation models within the scope of the invention.

It was noted above that in some embodiments at least, multiple different estimation models can be employed to determine a predicted or estimated data deduplication rate. The specific model to be employed in a particular case can be selected based on the accuracy of the results respectively produced by each of the models. Thus, for example, each model can be used to predict, retrospectively, the data deduplication rate for the preceding 'n' backups, such as the last 4 backups for example, and whichever model predicts with the least error will be selected to generate a predicted deduplication rate for a backup that is to be performed. It should be noted that where reference is made herein to 'n' backups, X can be any number.

The deduplication rate can then be used as a basis for determining the bandwidth that will be required for a particular backup, storage, and/or restore operation. For example, the following relationship can be used to determine required bandwidth: Required Bandwidth=(dataset/dedupe rate)/time available for backup. The 'time available for backup' can be calculated, for example, from the backup window specified by a backup administrator for a particular network. If the 'Required Bandwidth' is less than the calculated bandwidth, as calculated by one or more of the models disclosed herein, between the source and destination, then an alert can be sent to the backup administrator indicating that there is inadequate bandwidth to support the requested operation. In some instances, the requested operation may be performed notwithstanding inadequate bandwidth, although that operation may proceed more slowly than would otherwise be the case. As noted earlier, the source can be a client, storage server, or backup server and the destination can be a client, storage server, or backup server.

E. Aspects of Example Client and Server Processes

Figure 5:
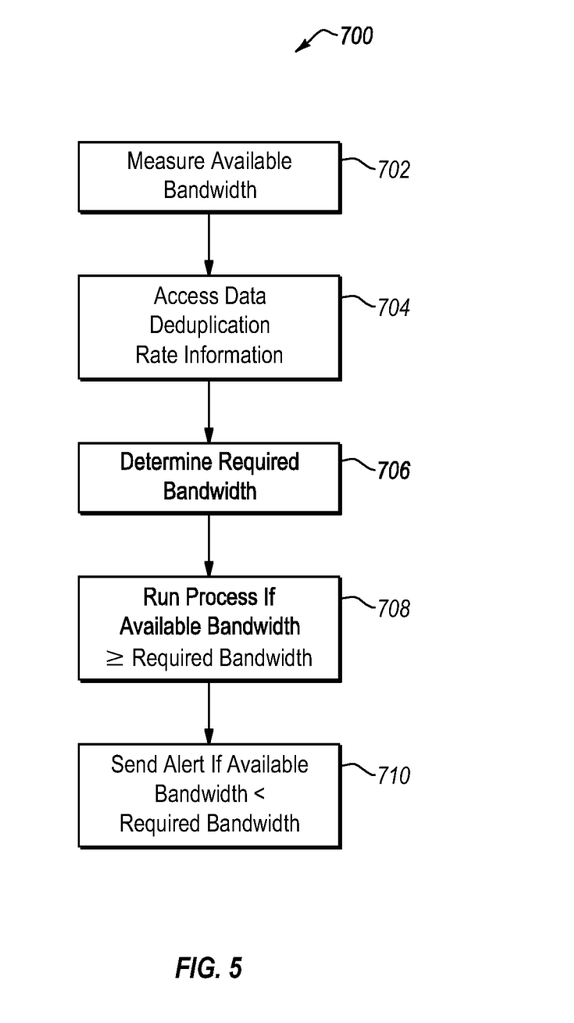
FIG. 5 is a flow diagram directed to aspects of another example method for performing network diagnostics, and associated processes.
Figure 6:
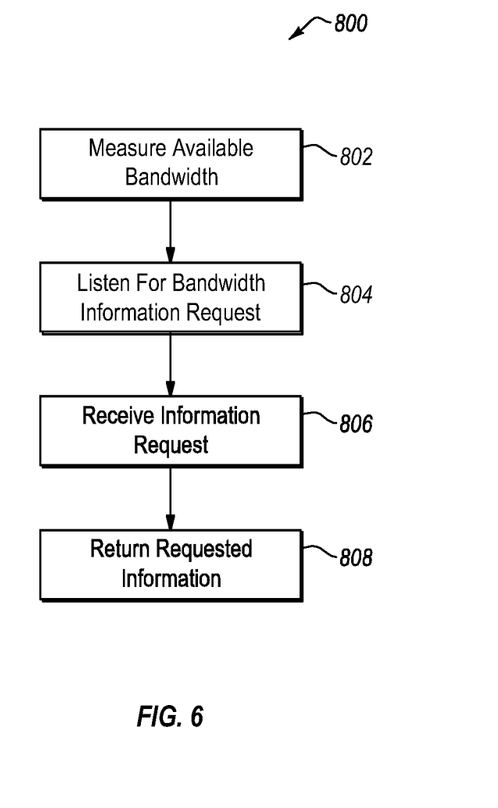
FIG. 6 is a flow diagram directed to aspects of an example method for providing network information.

With reference now to FIGS. 5 and 6, details are provided concerning some example client and server processes that involve, among other things, the determination of required network bandwidth for a particular operation, or operations, to be performed in environments such as those disclosed herein. Such operations can include, for example, any one or more of a backup operation in which data from a client is backed up by a backup server, a storage operation in which a backup is stored by the backup server at a storage server, and a restore operation in which a backup is restored from the storage server to one or more targets, such as a client. The methods disclosed in FIGS. 5 and 6 can be performed, for example, by a diagnostic tool residing at a client, or a diagnostic tool residing at a backup server.

Turning first to FIG. 5, an example method 700 is disclosed that may be performed by, or at the direction of, a client whose data is to be backed up. The method 700 can be performed by a diagnostic tool residing at the client. In some embodiments, the client can be an Avamar client, although that is not required. More generally, the client can be any device or entity that generates data that will be backed up.

The method 700 can begin when the client performs a measurement 702 of available bandwidth. The measurement can be performed with regard to a connection between the client and a backup server, a connection between the client and a storage server, or a connection between the client and any other entity by way of which data is desired to be transmitted. In some embodiments, the measurement 702 can be performed using the open source 'binary pingb' tool, although any other suitable tool could alternatively be used. As well, the measurement 702 can be performed in response to the triggering of a backup, or can be performed in response to any other event, or according to a time schedule.

Next, the client may access 704 data deduplication rate information. This deduplication rate information can be historical data gathered by the client or another entity in connection with previous operations, such as backup operations or restore operations for example. In some cases the data deduplication rate information that is accessed 704 may be stored at the client and/or at another entity, such as in the form of a table for example. Such a table or other data storage structure may include, for example, past deduplication rates for the client, as well as the respective date/time when data deduplication was performed at those rates.

Any other information could also be stored in the table or data structure, such as the size of prior backups, the dates of prior backups, the network bandwidth that was available at the time of each of the prior backups, the amount of time taken for prior backups, and the plugin(s) associated with each of the prior backups. The aforementioned information can also be stored in the table for restore operations, for example, the sizes and dates of prior restore operations, the network bandwidth that was available for prior restore operations, and the amount of time taken for prior restore operations.

The accessed 704 data deduplication rate information can also include historical deduplication rates for one or more other clients, such as clients in the same operating environment for example. In particular, this information can include historical deduplication rates for other clients using the same plugin as the client. In some instances at least, this historical information resides at the backup server or a storage server and is accessed there by the client. Alternatively, the client can download the information from the backup server or storage server, depending upon the operation to be performed.

Finally, the client can determine 706 the required bandwidth for the contemplated operation. The bandwidth can be determined with respect to a connection between the client and the backup server, or with respect to a connection between the client and a storage server. In general, determination 706 of the required bandwidth can be performed as disclosed elsewhere herein. The process, whether backup or restore, can then be run 708 if the available bandwidth is the required bandwidth. Otherwise, an alert can be sent 710 from the client to the storage server or backup server, as applicable, indicating that there is inadequate bandwidth available for the contemplated restore or backup process, respectively.

In some embodiments, a margin, such as 5 percent for example, can be provided so that if the available bandwidth is within the margin, the operation will proceed even though the available bandwidth may be less than the required bandwidth. Thus, in this example, if the available bandwidth is only 95 percent of the required bandwidth, the operation will proceed nonetheless. Selection of the appropriate margin can allow operations to continue in a relatively efficient, though not optimal, manner and may contribute to an overall higher level of productivity since an absolute bandwidth requirement can delay or prevent performance of some processes.

With reference now to FIG. 6, an example method 800 is disclosed that may be performed by, or at the direction of, a server, such as a backup server for example. The method 800 can be performed by a diagnostic tool residing at the backup server. In some embodiments, the server can be an Avamar server, although that is not required. More generally, the server can be any device or entity that is able to create a backup of client data and/or that is able to store a backup at a storage server or other storage target.

The method 800 can begin when the server performs a measurement 802 of available bandwidth. The measurement can be performed with regard to a connection between the backup server and a storage server, or a connection between the backup server and a client, or a connection between the backup server and any other entity by way of which data is desired to be transmitted. In some embodiments, the measurement 802 can be performed using the open source 'binary pingb' tool, although any other suitable tool could alternatively be used. As well, the measurement 802 can be performed in response to the triggering of a backup, storage of a backup, or can be performed in response to any other event, or according to a time schedule.

When the bandwidth information has been obtained, the backup server can push that information to a storage server or client, or the backup server can wait and listen 804 for a request for that information. As part of listening 804, the backup server can monitor a particular port to receive the request, and can then provide the bandwidth information. A request from the client or other entity can also indicate that there is a need for deduplication rate information associated with a particular plugin.

Thus, the backup server may subsequently receive 806 a request from a client, or storage server, for the deduplication rate information and/or the bandwidth information. This information can be specified by the client in two separate requests, or in a single request. In still other embodiments, the client may request only the bandwidth information, or only the deduplication rate information. Where the client requests the deduplication rate information, the backup server can query a database and return 808 the requested information to the client. The client can then use that information to determine a bandwidth requirement for a backup or other operation, as discussed above.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, switch, server, database, or storage node may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   checking network connectivity on a communication path between a backup server and a storage server;
   determining a path maximum transmission unit (PMTU) size on the communication path between the backup server and the storage server;
   measuring an available bandwidth of the communication path between the backup server and the storage server, wherein the measuring generates available bandwidth information;
   listening, on a communication port that is connected to the storage server, for a request from the storage server for the available bandwidth information;
   receiving, from the storage server, the request for the available bandwidth information;
   sending, to the storage server, the available bandwidth information in response to the request for the available bandwidth information;
   cooperating with a client to create a backup of client data;

determining a required bandwidth needed to transmit the backup from the backup server to the storage server, and the required bandwidth is expressed at least partly in terms of a data deduplication rate (DDR), and takes the following form:

required bandwidth=(backup size/DDR)/time available for backup, where DDR is determined by:
calculating preliminary DDR values using each of a plurality of estimation models, wherein the plurality of estimation models includes any two or more of (i) a first moving average estimation model that considers the last 'n' backups performed in a network in which the client resides, wherein one or more of the last 'n' backups were performed by a client other than the client, (ii) a second moving average estimation model that considers the last 'n' backups performed only by the client, and (iii) an averaging model that considers DDR information for a particular time period in which the client and other clients perform respective backups;
comparing each of the preliminary DDR values with actual DDR values of each of a plurality of prior backups; and
selecting as a final DDR, the calculated preliminary DDR value that is closest to the actual DDR values;
determining that (i) the available bandwidth meets or exceeds the required bandwidth and (ii) the PMTU size of the communication path between the backup server and the storage server is adequate to support transmission of the backup from the backup server to the storage server; and
transmitting the backup from the backup server to the storage server by way of the network path.

2. The method as recited in claim 1, wherein the operations of checking network connectivity, determining a PMTU size, measuring an available bandwidth, listening, receiving the request for the available bandwidth, and sending the available bandwidth information, are performed by a diagnostic tool residing on the backup server.

3. The method as recited in claim 1, wherein measurement of the available bandwidth is performed in response to the triggering of a backup.

4. The method as recited in claim 1, further comprising using the available bandwidth information as a basis for increasing the speed with which a hash filesystem check is performed.

5. The method as recited in claim 1, further comprising: returning requested DDR information to the client.

6. The method as recited in claim 5, wherein the requested DDR information is associated with a particular plugin that is hosted at the client.

7. A non-transitory storage medium having stored therein computer-executable instructions which, when executed by one or more hardware processors, implement and/or cause the implementation of the following operations:
checking network connectivity on a communication path between a backup server and a storage server;
determining a path maximum transmission unit (PMTU) size on the communication path between the backup server and the storage server;
measuring an available bandwidth of the communication path between the backup server and the storage server, wherein the measuring generates available bandwidth information;
listening, on a communication port that is connected to the storage server, for a request from the storage server for the available bandwidth information;
receiving, from the storage server, the request for the available bandwidth information;
sending, to the storage server, the available bandwidth information in response to the request for the available bandwidth information;
cooperating with a client to create a backup of client data;
determining a required bandwidth needed to transmit the backup from the backup server to the storage server, and the required bandwidth is expressed at least partly in terms of a data deduplication rate (DDR), and takes the following form:

required bandwidth=(backup size/DDR)/time available for backup, where DDR is determined by:
calculating preliminary DDR values using each of a plurality of estimation models, wherein the plurality of estimation models includes any two or more of (i) a first moving average estimation model that considers the last 'n' backups performed in a network in which the client resides, wherein one or more of the last 'n' backups were performed by a client other than the client, (ii) a second moving average estimation model that considers the last 'n' backups performed only by the client, and (iii) an averaging model that considers DDR information for a particular time period in which the client and other clients perform respective backups;
comparing each of the preliminary DDR values with actual DDR values of each of a plurality of prior backups; and
selecting as a final DDR, the calculated preliminary DDR value that is closest to the actual DDR values;
determining that (i) the available bandwidth meets or exceeds the required bandwidth and (ii) the PMTU size of the communication path between the backup server and the storage server is adequate to support transmission of the backup from the backup server to the storage server; and
transmitting the backup from the backup server to the storage server by way of the network path.

8. The non-transitory storage medium as recited in claim 7, wherein the operations of checking network connectivity, determining a PMTU size, measuring an available bandwidth, listening, receiving the request for the available bandwidth, and sending the available bandwidth information, are performed by a diagnostic tool residing on the backup server.

9. The non-transitory storage medium as recited in claim 7, wherein measurement of the available bandwidth is performed in response to the triggering of a backup.

10. The non-transitory storage medium as recited in claim 7, wherein the operations further comprise: returning requested DDR information to the client.

11. The non-transitory storage medium as recited in claim 10, wherein the DDR information is associated with a particular plugin hosted at the client.

12. A server, comprising:
one or more hardware processors; and
the non-transitory storage medium as recited in claim 7.

* * * * *